United States Patent Office 3,647,901
Patented Mar. 7, 1972

3,647,901
COBALT SALT-PHOSPHINE-ORGANOALUMINUM CATALYSTS FOR PREPARING 1,4-DIENES
Christos Sarafidis, Wilmington, Del., assignor to E. I. du Pont de Nemours and Company, Wilmington, Del.
No Drawing. Continuation-in-part of application Ser. No. 616,771, Feb. 17, 1967. This application June 22, 1970, Ser. No. 48,504
Int. Cl. C07c 11/12
U.S. Cl. 260—680 B   10 Claims

ABSTRACT OF THE DISCLOSURE

A catalyst for use in preparing 1,4-dienes from alpha-monoolefins and conjugated dienes. The catalyst is prepared by mixing, in any order, an organoaluminum compound, a cobalt salt and a diphenyl alkenyl or dialkenyl phenyl phosphine in a liquid medium, either in the presence of the monomers or separately. The reaction for preparing the 1,4-dienes is carried out in an inert organic solvent at temperatures of 25 to 150° C. and pressures ranging from 1 atmosphere to 2000 p.s.i.g. The invention provides catalysts which are readily available and which form 1,4-dienes at feasible rates with a minimum of by-product formation.

PRIORITY

This application is a continuation-in-part of application Ser. No. 616,771, filed Feb. 17, 1967 and now abandoned.

BACKGROUND OF THE INVENTION

This invention relates to a novel catalyst for preparing 1,4-dienes from alpha-monoolefins and conjugated dienes. More particularly it relates to an organoaluminum-cobalt salt-organic phosphine catalyst and its use in synthesizing 1,4-dienes.

Alpha-olefin elastomers are of increasing importance today. Particularly valuable are the copolymers containing sulfur-curable side-chain unsaturation resulting from incorporation of nonconjugated diene units. U.S. Pat. 2,933,480 to Gresham et al., describes representative copolymers of this type. Nonconjugated dienes useful in making these copolymers include 1,4-hexadiene itself and derivatives wherein the monomer still has one terminal vinyl group, e.g., 4-methyl-1,4-hexadiene. Other 1,4-diene containing elastomers are also important, for example, the copolymer prepared by copolymerizing isobutylene with 2-alkyl-1,4-hexadienes in the presence of a cationic catalysts, e.g., a Friedel-Crafts catalyst such as boron trifluoride or stannic chloride-water.

Various catalysts are known for use in synthesizing 1,4-dienes from alpha-monoolefins and conjugated dienes. Japanese patent publication 7850/66 discloses making hexadiene with $FeCl_2$, $PR_3$ where R is aryl, alkoxy or phenoxyl and dialkyl aluminum chloride. Japanese patent publication 8052/66 discloses making 1,4-hexadiene with a $CoX_2(R_2PCH_2CH_2PR_2)_2$ aluminum trialkyl catalyst where X is halogen and R is alkyl or phenyl. The phosphine catalysts disclosed in these publications and others of a similar nature, while being somewhat effective in catalyzing the desired reaction, are sometimes deficient with respect to their activity and stereoselectivity, i.e., their use results in the production of substantial amounts of undesirable by-products in addition to the desired 1,4-dienes. U.S. Pat. 3,496,247 to Yuguchi et al. discloses making hexadienes by the addition reaction of an alpha-monoolefin with a conjugated diene in the presence of a catalyst prepared by mixing a cobalt salt, an organoaluminum compound and a phosphorus compound of the formula $PR_3$ wherein R is alkyl, aryl or substituted aryls. These catalysts are deficient with respect to their activity and result in relatively low yields of hexadiene.

Because of the great utility of aliphatic 1,4-dienes in making important elastomers, there has been a need for a catalyst system of high activity and ready availability which, when used in the reaction of conjugated dienes and alpha-monoolefins, produces the desired 1,4-dienes in good yield.

SUMMARY OF THE INVENTION

According to this invention aliphatic 1,4-dienes are effectively prepared by reacting an alpha-monoolefin with a conjugated diene in the presence of a catalyst prepared by mixing an organoaluminum compound, a cobalt salt and an organic phosphine of the formula:

wherein one or two of the groups X, Y and Z are phenyl or substituted phenyl, the substituents being at least one of $C_1$–$C_4$ alkyl, $C_1$–$C_4$ alkoxy, or halogen and the remaining groups are independently $C_2$–$C_{10}$ alkenyl, all carbon atoms in said alkenyl groups beyond the fifth from the phosphorous atom being saturated. The catalyst components are mixed in such proportions that there is at least 0.5 phosphorus and one aluminum atom for each cobalt atom. It has been found that such catalysts exhibit unexpectedly superior catalytic activity and result in high yields of 1,4-diene.

DETAILED DESCRIPTION OF THE INVENTION

Ethylene is the preferred monoolefin for use in the present invention, being commercially available in large quantities at a very low price and, importantly, capable of combining with a conjugated diene to give a 1,4-diene having a terminal carbon-carbon double bond well suited for the reaction with coordination catalysts. Other alpha-monoolefins which may be used in this invention are those having the formula $R—CH_2—CH=CH_2$ where R is hydrogen, $C_1$–$C_{15}$ alkyl or halogenated $C_1$–$C_{15}$ alkyl. Of this group the commercially available members having up to about six carbon atoms are preferred; propylene is the most preferred because of its availability and the importance of the dienes formed when it is used. A preferred example of the halogenated alpha-monoolefin is 5,6-dibromo-1-hexene. Other examples of hydrocarbons and halogenated hydrocarbon alpha-monoolefins suitable for use in the present invention are given in U.S. Pat. 3,222,330 to Nyce et al.

The conjugated dienes which may be used in this invention are those having the formula:

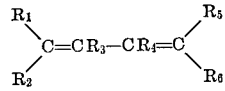

wherein each of $R_1$ and $R_5$ is tolyl, halophenyl, phenyl, alkyl, hydrogen or $R_1$ and $R_5$ are joined together to form a cyclic diene containing up to 12 carbon atoms in the ring; each of $R_2$ and $R_6$ is alkyl or hydrogen and each of $R_3$ and $R_4$ is hydrogen, alkyl, aryl, alkaryl, aralkyl, or halo. The preferred conjugated diene for use in the present invention is 1,3-butadiene; it is commercially available in large quantities at an attractive price and, when combined with ethylene, makes possible the preparation of 1,4-hexadiene which is a monomer particularly preferred for use in preparing sulfur curable hydrocarbon elastomers by coordination catalysis. Other conjugated dienes which are useful in the present invention include isoprene, 1,3-pentadiene; 2,4-hexadiene; 2,3-dimethyl-1,3-butadiene; 2-chloro-1,3-butadiene (chloroprene); 2,3-dichloro-1,3-butadiene; 1-phenyl-1,3-butadiene; 2-phenyl-1,3-butadiene; 1-p-tolyl-butadiene; 1,2-diphenyl-1,3-butadiene; 2,3-diphenyl-1,3-butadiene; 2-ethyl-1-phenyl-1,3-butadiene and 1-p-chlorophenyl-1,3-butadiene.

Although the reaction of this invention involves the equimolecular addition of an alpha-monoolefin to a conjugated diene, it is not necessary to employ equimolar amounts of reactants. In typical batch operations the ratio of reactants can be continually changing. Both the alpha-monoolefin and the conjugated diene can be introduced into the reactor to establish a suitable value of the ratio before the reaction is initiated; thereafter additional alpha-monoolefin is fed therein during the course of the reaction until the desired conversion of the conjugated diene to the 1,4-diene is obtained. One or both of the reactants can be charged to the reaction vessel, continuously or intermittently during the reaction. In a preferred process, ethylene is maintained at substantially a constant pressure over the diene (which is in solution as discussed hereinafter), until consumption of ethylene ceases. The proportions of reactants to be used in a given reaction can be routinely determined by one skilled in the art with reference to the examples which follow. The catalysts of this invention are prepared by mixing an organoaluminum compound, a cobalt salt and an organic phosphine which is a diphenyl alkenyl or dialkenyl phenyl phosphine. A wide variety of organoaluminum compounds or mixtures thereof can be employed. Suitable classes include: triorganoaluminum compounds; organoaluminum halides such as diorganoaluminum monohalides; organoaluminum dihalides and organoaluminum sesquihalides wherein the halide is chloride, bromide or iodide; diorganoaluminum hydrides and diorganoaluminum alkoxides wherein the alkoxide contains about 1–8 carbon atoms. The organic group can be varied widely and includes alkyl, aryl, aralkyl and alkaryl radicals. The aryl groups in all of these organoaluminum compounds can bear ring substituted halogens.

The molecular weight of the organoaluminum compound is not critical; in general practice there is usually no practical advantage in employing compounds wherein the individual organic groups have more than 18 carbon atoms. The preferred compounds are diisobutylaluminum monochloride and triisobutylaluminum because of the faster rate of reaction which they induce and their ready availability. Isobutylaluminum dichloride and ethylaluminum sesquihalide are also particularly important in this invention. Other useful representative organoaluminum compounds include: tri-n-butylaluminum; diethylaluminum bromide; isobutylaluminum dibromide; diisopropylaluminum monochloride; di-n-hexylaluminum monochloride; di-n-amylchloroaluminum; isopropylaluminum dichloride; triphenyl aluminum; diphenylaluminum monochloride; bis(p-tolyl)aluminum monochloride; bis(p-chlorophenyl)aluminum monochloride; bis(3,4-dichlorophenyl)aluminum monochloride; bis(p-fluorophenyl)aluminum-monochloride; dibenzylaluminum monochloride; diisobutylaluminum hydride and diethylaluminum ethoxide. Similar compounds containing condensed aromatic rings such as diisobutylnaphthylaluminum are also suitable.

The aluminum compound is added in amounts such that there is at least one aluminum atom for each cobalt atom in the catalyst. Greater amounts of aluminum up to 200 atoms per cobalt atom may be used but are not economical. A preferred ratio is about 2–15 atoms of aluminum per atom of cobalt. Aluminum present in this quantity is commercially feasible and gives excellent reaction rates.

A wide variety of cobalt salts are used in this invention including those containing the cobalt atom in the (II) or (III) valence state. Representative examples are cobalt tris(acetylacetonate), cobalt di(acetylacetonate), cobalt (II) chloride ($CoCl_2$), cobalt (II) bromide ($CoBr_2$), cobalt (II) iodide ($CoCl_2$), cobalt diacetate and cobalt dinaphthenate. The cobalt acetylacetonates and dichloride are preferred because of their high activity and availability.

The organic phosphine is a necessary component of the catalyst along with the cobalt salt and organo-aluminum compound. The phosphine corresponds to the formula:

wherein one or two of the groups X, Y and Z are phenyl or substituted phenyl, the substituents being at least one of $C_1$–$C_4$ alky, $C_1$–$C_4$ alkoxy, or halogen and the remaining groups are independently $C_2$–$C_{10}$ alkenyl, all carbon atoms in said alkenyl groups beyond the fifth from the phosphorous atom being saturated. This group of phosphines exhibit a high degree of activity and form excellent yields of the desired 1,4-dienes with a minimum of by-products. Representative phosphines within the scope of this invention are:

allyldiphenylphosphine
diallylphenylphosphine
bis(2-methylallyl)phenylphosphine
phenyldivinylphosphine
diphenylvinylphosphine
phenyldipropenylphosphine
3-butenyldiphenylphosphine
2-butenyldiphenylphosphine
di(3-butenyl)phenylphosphine
di(2-butenyl)phenylphosphine
di(2-pentenyl)phenylphosphine
2-pentenyldiphenylphosphine
diphenyl-2-octenylphosphine
phenyl-di(2-octenyl)phosphine
2-decenyl-diphenylphosphine
di(3-decenyl)phenylphosphine
diallyl(p-ethylphenyl)phosphine
diallyl(p-methoxyphenyl)phosphine
diallyl-p-tolylphosphine
diallyl-2,5-xylylphosphine
diallyl-p-bromophenylphosphine
(p-methoxyphenyl)bis(2-methylallyl)phosphine Diallyl phenyl phosphine and diphenyl allyl phosphine are particularly preferred phosphines. The phosphines which are used in this invention can be prepared according to procedures described in Houben-Weyl, Methoden der Organischen Chemie, Vierte Auflage Phosphor Verbindugen I, 12/1, Georg Thieme Verlag Stuttgart 1963, and Organo Phosphorus Compounds, G. M. Kosalapoff; John Wiley and Sons, N.Y., 1950. The proportions are selected such that there is at least 0.5 phosphorus atom for each cobalt atom present. The preferred value of the phosphine: cobalt atom ratio is 2–10:1, particularly when the catalyst is used at a temperature near the upper end of the temperature range mentioned hereinafter. Since the phosphine is the most expensive component of the catalyst, higher proportions than 4:1 are ordinarily not used; the upper limit being dictated by economics.

The catalyst components are mixed together in an inert liquid medium, usually the hereinafter described inert organic diluent in which the reaction is carried out. The components can be mixed separately or in situ in the presence of the monomer reactants. The order is not critical and allows for a variety of procedures to be used at the convenience of one skilled in the art. However, to afford maximum protection against side reactions regardless of whether the catalyst is mixed separately or in the presence of the monomers, it is preferred that the cobalt salt and the phosphine be brought together before the organoaluminum compound is added. When this procedure is followed, the organoaluminum compound is added to the other catalyst components before or after the alpha-monolefin and conjugated diene are present.

The preparation of the catalyst and its use in effecting the formation of 1,4-dienes from alpha-olefins and conjugated dienes can be carried out over a wide range of temperatures, that is, from about 25° C. to 150° C. The preferred temperature range lies between about 50° C. to about 125° C.

The proportion of the catalyst in the monomer reaction zone can be varied widely. For economic reasons, it is desirable to use as little catalyst as possible consistent with a reasonable reaction rate; a lower limit being at least about 0.001 millimole of the cobalt compound per mole of conjugated diene used. Typical proportions are illustrated by the examples which follow, though proportions outside these ranges can be employed if desired. Those skilled in the art can determine the optimum amount of a particular catalyst for a particular set of monomers by routine experiments.

The pressure employed will vary with the volatility of the monomers and inert medium used and the reaction temperatures selected. A practical range of pressures for generally available reactors is from about one atmosphere absolute to about 2000 p.s.i.g. In order to operate at temperatures at which product formation takes place at a convenient rate, it may be necessary to maintain superatmospheric pressure to liquefy the diene.

The reaction is carried out in an inert organic diluent. By "inert" it is meant that the diluent will not deactivate the catalyst; thus it does not contain groups bearing Zerewitinoff-active hydrogen atoms, for example, hydroxyl groups, carboxyl groups, and the like and it is free from impurities such as alcohol and water bearing these substituents. Oxygen and carbon monoxide should also be excluded. For optimum yields, the diluent should not undergo side-reactions with the catalyst, the monomers, or the 1,4-diene products. Purification of the diluent and monomers can be carried out by the procedures familiar to those skilled in the art of coordination catalysis where organoaluminum compounds are involved. If it is desirable to isolate the 1,4-diene from the reaction mixture, it is preferable that the diluent be easily separable; the boiling point of the diluent should thus be different enough from that of the diene product to afford convenient fractionation. Representative suitable diluents include: tetrachloroethylene, methylene chloride, chlorobenzene, aromatic hydrocarbons such as benzene and toluene; and aliphatic and cycloaliphatic hydrocarbons such as hexane and decalin, respectively. The greatest catalyst activity occurs in chlorinated hydrocarbons. It is believed that any diluent useful for conducting the coordination catalyzed polymerization of hydrocarbon monomers can be used here. The conjugated diene itself, for example, 1,3-butadiene, can serve as the diluent.

The 1,4-diene can be prepared by the process of the present invention in a batch reactor or in a continuous reactor. The reaction time is selected to carry out the desired conversion of reaction of 1,4-diene and can vary widely. Optionally, the reaction is stopped by adding a minimal amount of Zerewitinoff-active hydrogen compound, frequently a low molecular weight alcohol such as isopropanol, to deactivate the catalyst. In any case gases are let off and the liquid directly distilled, the 1,4-diene being separated by fractionation. Representative procedures are given in the examples which follow. The reaction mixture which continually overflows from a continuous reaction zone is treated by suitable continuous or batch purification and fractionation procedures to yield the 1,4-diene, the catalyst being recycled for reuse when desired.

As will be apparent from the following examples, this invention provides readily available catalysts which exhibit excellent performance with respect to the rates of reaction which they induce and yields of 1,4-dienes obtained.

EXAMPLE 1

This example illustrates the use of the catalysts of this invention in synthesizing cis-1,4-hexadiene from ethylene and butadiene and compares the efficiency of the diphenyl alkenyl and dialkenyl phenyl phosphine catalysts of this invention with the efficiency of catalysts containing other organic phosphines. Air is excluded throughout unless otherwise indicated. The general procedure is as follows:

A 1.9-liter stirred autoclave is flushed with prepurified nitrogen and charged with a cobalt salt and a solvent (dichloromethane in Run 1; toluene in Runs 2, 6, 8, 9, 12–15 and 17; and chlorobenzene in the others). The phosphine, dissolved in about 5 milliliters of toluene, is added and the autoclave is cooled with a crushed solid carbon dioxide acetone bath. Butadiene is then added by distillation and the reactor is heated to the lowest temperature indicated in the temperature column of Table I. Ethylene is added until the pressure is 100 p.s.i.g. The organoaluminum compound, dissolved in about 10 milliliters of the same solvent in each run as indicated above, is then added to the reactor and the mixture stirred over the range of temperatures and for the time indicated in the temperature and time columns of Table I. During the reaction period the pressure is maintained within the range shown in Table I with ethylene. After the reaction period is over, about 0.5 to 2 milliliters isopropyl alcohol is added, the gases vented off and the liquid remaining analyzed by gas chromatography for its content of cis-1,4-hexadiene. Yields based on the introduced butadiene are shown in Table I.

The above general procedure is followed in carrying out nineteen experiments. All of the components and significant conditions of each run are indicated in Table I

TABLE I

| Run No.: | Co salt | Organoaluminum | Phosphine | Temperature (° C.) | Pressure (p.s.i.g) | Time (minutes) | Butadiene (grams) | Cis-1,4-hexadiene (grams) | Yield [1] (percent) |
|---|---|---|---|---|---|---|---|---|---|
| 1 | $Co(AcAc)_3$ | $(i-C_4H_9)_2AlCl$ | $(C_6H_5)_2PCH_2CH-CH_2$ | 72–93 | 95–100 | 28 | 80 | 79.6 | 65.6 |
| 2 | $Co(AcAc)_3$ | $(i-C_4H_9)_2AlCl$ | $(C_6H_5)_2PCH_2CH-CH_2$ | 89–97 | 98–102 | 120 | 78 | 92.5 | 78.1 |
| 3 | $Co(AcAc)_3$ | $(i-C_4H_9)_2AlCl$ | $(C_6H_5)_2PCH_2CH-CH_2$ | 69–77 | 80–100 | 40 | 89 | 111.6 | 75.1 |
| 4 | $Co(AcAc)_3$ | $(i-C_4H_9)_2AlCl$ | $(C_6H_5)_2PCH_2CH-CH_2$ | 50–116 | 60–100 | 5 | 86 | 95.5 | 73.2 |
| 5 | $CoCl_2$ | $(i-C_4H_9)_3Al$ | $(C_6H_5)_2PCH_2CH-CH_2$ | 80–100 | 80–100 | 25 | 72 | 95.5 | 87.5 |
| 6 | $CoCl_2$ | $(i-C_4H_9)_3Al$ | $(C_6H_5)_2PCH_2CH-CH_2$ | 83–96 | 75–105 | 150 | 75 | 73.6 | 64.7 |
| 7 | $Co(AcAc)_3$ | $(i-C_4H_9)_3Al$ | $(C_6H_5)_2PCH_2CH-CH_2$ | 90–95 | 100–104 | 30 | 78 | 103 | 86 |
| 8 | $Co(AcAc)_3$ | $(i-C_4H_9)_3Al$ | $(C_6H_5)_2PCH_2CH-CH_2$ | 94–95 | 100 | 120 | 77 | 54 | 46.2 |
| 9 [2] | $Co(AcAc)_3$ | $(i-C_4H_9)_2AlCl$ | $[(C_2H_5)_2NCH_2]_3P$ | 90–94 | 98–101 | 90 | 48 | 12.8 | 17.5 |
| 10 [2] | $Co(AcAc)_2$ | $(i-C_4H_9)_2AlCl$ | $(C_6H_5)_2P-n-C_4H_9$ | 90–98 | 96–100 | 47 | 91 | 32.9 | 23.8 |
| 11 [2] | $Co(AcAc)_2$ | $(i-C_4H_9)_2AlCl$ | $(n-C_4H_9)_2PC_6H_5$ | 94–97 | 96–100 | 90 | 61 | 28.9 | 31.2 |
| 12 [2,3] | $Co(AcAc)_3$ | $(i-C_4H_9)_2AlCl$ | $(n-C_4H_9)_2PC_6H_5$ | 100 | 1,000 | 60 | 50 | 45.3 | 59.7 |
| 13 | $Co(AcAc)_3$ | $(i-C_4H_9)_2AlCl$ | $(n-C_4H_9)_3P$ | 95 | 105–107 | 300 | 69 | 17 | 16.3 |
| 14 | $Co(AcAc)_3$ | $(i-C_4H_9)_2AlCl$ | $(C_6H_5)_2PCl$ | 95–100 | 103–112 | 60 | 157 | 35.5 | 14.9 |
| 15 [2] | $Co(AcAc)_3$ | $(i-C_4H_9)_2AlCl$ | $(C_6H_5)_2PH$ | 92–96 | 105–109 | 180 | 88 | 42.5 | 31.8 |
| 16 | $Co(AcAc)_3$ | $(i-C_4H_9)_2AlCl$ | $C_6H_5P(CH_2CH=CH_2)_2$ | 98–115 | 95–115 | 10 | 75 | 95 | 82 |
| 17 | $Co(AcAc)_3$ | $(i-C_4H_9)_2AlCl$ | $C_6H_5P(CH_2CH=CH_2)_2$ | 99–101 | 95–106 | 33 | 65 | 69 | 70 |
| 18 | $CoCl_2$ | $(i-C_4H_9)_2AlCl$ | $C_6H_5P(CH_2CH=CH_2)_2$ | 94–98 | 98–107 | 90 | 76 | 69 | 60 |
| 19 | $CoCl_2$ | $(i-C_4H_9)_3Al$ | $C_6H_5P(CH_2CH=CH_2)_2$ | 96–100 | 95–105 | 58 | 65 | 75 | 76 |

[1] Cis-1,4-hexadiene based on introduced butadiene.  [2] Outside scope of this invention, provided for comparison.  [3] Reaction carried out in a 400 ml. stainless steel shaker tube.

NOTE: The catalyst is premixed and aged at room temperature in the absence of monomers as follows: 15 minutes in Run 13; 30 minutes in Run 10; 34 minutes in Run 4; 60 minutes in Run 8; 90 minutes in Runs 5–7; 40 minutes in Run 16; 53 minutes in Runs 17–18; 27 minutes in Run 19.

with the exception of the amounts of catalyst components and solvents used which are as follows:

Cobalt Salt (millimoles)—0.5 in Runs 1–4, 7–11, and 13–19; 0.75 in Runs 5 and 6 and 0.25 in Run 12.

Organoaluminum (millimoles)—1 in Runs 18 and 19; 5 in Runs 1–4, 7, 8, 12, 13 and 16 and 17; 8 in Runs 5 and 6; and 10 in Runs 9, 10, 11 and 14–15.

Phosphine (millimoles)—0.5 in Run 16; 1 in Runs 9, 17, 18 and 19; 2.5 in Runs 1–4, 6, 7, 10, 12 and 13; 4.5 in Run 5; 5 in Run 11; 2 in Runs 8; 14 and 15.

Solvent (milliliters)—500 in Runs 1–8, 10, 11, 13–19; 100 in Run 12 and 400 in Run 9.

It is apparent, when the data of Runs 1–8 and 16–19 are compared to the data of Runs 9–15, that the organo-aluminum-colbalt salt-dialkenyl phenyl and diphenyl alkenyl phosphine catalyst compositions of the present invention are much more effective in synthesizing 1,4-dienes from alpha-monoolefins and conjugated dienes than are phosphine-containing catalysts in which the phosphine component does not contain only phenyl and alkenyl groups.

EXAMPLE 2

This example illustrates the preparation of 2-methyl-1,4-hexadiene from propylene and 1,3-butadiene. The procedure followed is the same as that described in Example 1 except the catalyst is premixed and aged about 5 minutes in the absence of the monomers and propylene is used in place of ethylene. The catalyst components are as follows: 2 millimoles cobalt (III) acetylacetonate, 8.6 millimoles diphenyl(allyl) phosphine dissolved in 50 milliliters of monochlorobenzene and 15.5 millimoles of diisobutyl aluminum chloride. The catalyst is prepared by mixing the cobalt salt and phosphine and then adding the organoaluminum compound. The reaction is carried out in 700 ml. of monochlorobenzene using 101 g. (1.87 mole) of butadiene at 97–100° C. and 76–121 p.s.i.g. of propylene for 5 hours and 55 minutes.

The yield of 2-methyl - 1,4 - hexadiene is 81.3 g.

EXAMPLE 3

This example illustrates the synthesis of $C_7$ dienes from ethylene and isoprene. The procedure followed is the same as that used in Example 1 except the catalyst is premixed and aged 13 minutes in the absence of monomers and the diene is introduced with a syringe. The catalyst components are as follows: 1 millimole cobalt (III) acetylacetonate; 6.5 millimoles diphenyl(allyl)phosphine dissolved in 50 mls. monochlorobenzene; and 10 millimoles of diisobutyl aluminum chloride in 10 ml. tetrachloroethylene. The reaction is carried out in 350 ml. of monochlorobenzene using 100 g. (1.47 moles) of isoprene at temperatures of 95–97° C. and ethylene pressure of 87–89 p.s.i.g. for one hour.

The yield of $C_7$ dienes is 52 g. (36.8% based on isoprene) consisting essentially of 79% 4-methyl- and 21% 5-methyl-1,4-hexadiene. Analyses are made by gas chromatography.

As is apparent from the examples, the catalysts of this invention can be employed to produce 1,4-dienes from alpha-monoolefins and conjugated dienes at rapid rates and good yields.

I claim:
1. An organoaluminum-cobalt salt-organic phosphine catalyst prepared by mixing an organoaluminum compound, a cobalt salt and a phosphine of the formula:

wherein one or two of the groups X, Y and Z are phenyl or substituted phenyl, the substituents being at least one of $C_1$–$C_4$ alkyl, $C_1$–$C_4$ alkoxy, or halogen, and the remaining groups are independently $C_2$–$C_{10}$ alkenyl, wherein all carbon atoms in said alkenyl groups beyond the fifth from the phosphorous atom are saturated; said components being mixed in such proportions that there is at least about 0.5 of organic phosphine molecule per atom of cobalt and at least one atom of aluminum per atom of cobalt.

2. The catalyst of claim 1 wherein the organo-aluminum compound is an organoaluminum chloride.

3. The catalyst of claim 1 wherein the organoaluminum compound is triisobutylaluminum or diisobutylaluminum chloride, the cobalt salt is cobalt diacetylacetonate, cobalt triacetylacetonate or cobalt dichloride.

4. The catalyst of claim 3 wherein the phosphine is diphenyl allyl phosphine or diallyl phenyl phosphine.

5. The catalyst of claim 4 wherein the components are present in such proportions that there are 2–10 molecules of phosphine per cobalt atom and 2–15 atoms of aluminum per atom of cobalt.

6. In a process for the preparation of an aliphatic 1,4-diene by contacting at a temperature of about 25–150° C., in the presence of a catalyst, an alphamonoolefin with a conjugated diene; the improvement which consists essentially of using as the catalyst the product of claim 1.

7. In a process for the preparation of an aliphatic 1,4-diene by contacting at a temperature of about 25–150° C., in the presence of a catalyst, an alpha-monoolefin with a conjugated diene; the improvement which consists esesentially of using as the catalyst the product of claim 3.

8. In a process for the preparation of an aliphatic 1,4-diene by contacting at a temperature of about 25–150° C., in the presence of a catalyst, an alpha-monoolefin with a conjugated diene; the improvement which consists essentially of using as the catalyst the product of claim 5.

9. The process of claim 8 wherein the alpha-monoolefin is ethylene or propylene and the conjugated diene is 1,3-butadiene or isoprene.

10. The process of claim 9 carried out at a temperature of about 50° C. to about 150° C.

References Cited

UNITED STATES PATENTS 3,482,001  12/1969  Eberhardt _____ 260—683.15
3,496,247   2/1970  Yuguchi et al. _____ 260—680

PAUL M. COUGHLAN, JR., Primary Examiner

U.S. Cl. X.R.

252—429 B, 431 P